United States Patent

Dulaney et al.

[11] Patent Number: 6,144,012
[45] Date of Patent: Nov. 7, 2000

[54] EFFICIENT LASER PEENING

[75] Inventors: Jeff L. Dulaney, Dublin; Allan H. Clauer, Worthington; Steven M. Toller, Grove City, all of Ohio

[73] Assignee: LSP Technologies, Inc., Dublin, Ohio

[21] Appl. No.: 08/964,798

[22] Filed: Nov. 5, 1997

[51] Int. Cl.[7] ............................................. B23K 26/00
[52] U.S. Cl. ................................. 219/121.85; 148/525
[58] Field of Search ........................... 148/525, 565; 219/121.65, 121.66, 121.84, 121.85, 121.68, 121.69

[56] References Cited

U.S. PATENT DOCUMENTS 5,756,965  5/1998  Mannava ........................ 219/121.85
5,790,620  8/1998  Okazaki et al. ...................... 148/525
5,935,464  8/1999  Dulaney et al. ................... 219/121.65

Primary Examiner—Geoffrey S. Evans
Attorney, Agent, or Firm—Randall J. Knuth

[57] ABSTRACT

A method of laser shock peening a workpiece including the steps of laser shock peening at least one surface of the workpiece so that it extends over an area of the workpiece and forms a region having compressive residual stresses imparted by the laser shock peening extending into the workpiece from the surface, and firing a laser beam to produce the laser shock peened surface with more than one row of laser beam spots, wherein adjacent laser beam spots and/or rows are one of touching or spaced apart from each other.

34 Claims, 5 Drawing Sheets

EFFICIENT LASER PEENING

BACKGROUND OF THE INVENTION

1. Field of the Invention

The present invention relates to the use of coherent energy pulses, as from high-power pulsed lasers, in the shock processing of solid materials and more particularly to a method for improving properties of solid materials by providing shock waves therein, where the laser beam impacts the solid material at spots without overlap or at varied separations. The invention is especially used for enhancing or creating desired physical properties such as hardness, strength, and fatigue strength.

2. Description of the Related Art

Known methods for the shock processing of solid materials, particularly known methods for the laser shock processing of solid materials, typically use coherent energy from a laser beam oriented normal to a workpiece.

Typical laser shock processing techniques and equipment can be found in U.S. Pat. No. 5,131,957 to Epstein.

Previous laser shock processing of workpieces include overlapping the processed areas, i.e., the laser peened spots created on the workpiece. This overlapping was accomplished to ensure that there were no gaps of worked areas on the workpiece. Furthermore, it was thought that such overlapping of processed areas (spots) would ensure that the entire worked area had a sufficient residual stress component. Different types of percentages of overlap, in terms of geometry, spacing, and such, have been utilized in the art such as 10 to 20 to 50 percent overlap of the particular processed spots on the workpiece.

A laser spot as used in this application refers to the actual workpiece surface irradiated by a laser pulse beam. A laser shocked region is that area of a workpiece in which a desired residual compressive stress field is created. Prior to this invention, large regions were laser peened with overlapping laser spots.

What is needed in the art is a time efficient process of processing such laser shock region while maintaining their requisite required residual compressive stress field.

SUMMARY OF THE INVENTION

The present invention provides a method of laser shock processing that can be used in a production environment to significantly increase the process speed. Generally, the concept that the inventors have discovered is that it is not a requirement to cover or irradiate the entire laser shock region with the laser spots. Experimental evidence has proven that it is possible to permit the laser spots to be oriented edge to edge or to be separated by a predetermined distance. Such predetermined distance is found experimentally based upon the laser beam power utilized and other processing factors, along with the type of workpiece material and geometries involved.

A bridging effect of the residual compressive stress field is created between laser spots. Furthermore, experimental evidence has shown that the residual compressive stress between two or more spots can be similar and/or equivalent to the residual compressive stress of an area actually impacted by the laser beam. In this application, a row of laser peened spots is defined as a collinear series of spots.

In one form of the invention, the method calls for laser shock peening at least one laser shock peened surface of the workpiece. The laser shock peened surface is created so that it extends over an area of the workpiece and forms a region having deep compressive residual stresses imparted by the laser shock peening, extending into the workpiece from the laser shock peened surface. The method further includes firing a laser beam to produce the laser shock peened surface with more than one row of laser beam spots; wherein, the laser beam spots are either touching or spaced apart from each other. In particular embodiments of the invention, the laser beam spots are specifically shaped, such as rectangular, square, elliptical, hexagonal, and even circular. As used in this application, touching of adjacent laser spots is defined that each spot is in contact with an adjacent spot without significant or substantial overlap. Such possible overlap should preferably be limited to five percent or less of the spot area.

Adjacent laser beam spots may be separated by a distance to prevent residual surface tensile stress from forming in the workpiece therebetween. Furthermore and most preferred, adjacent laser beam spots may be separated by a distance that insures residual compressive stresses are formed in the workpiece therebetween.

In another form of the invention, a method of laser shock peening the workpiece includes the steps of laser shock peening at least one laser shock peened surface of the workpiece, the laser shock peening of the laser shock peened surface is accomplished so that it extends over an area of the workpiece and forms a region having deep compressive residual stresses imparted by laser shock peening extending into the workpiece from the laser shock peened surface, and firing a laser beam to produce a plurality of rectangular spots.

In yet another form of the invention, with use of rectangular of elliptical spots, such spots may be overlaid to form a mesh with interwoven non-processed areas. Such interwoven non-processed areas are created such that they have no surface tensile residual stress, but preferably have a surface compressive residual stress.

A further form of the invention comprises a workpiece formed of a metallic member having a surface, with at least one laser shock peened area on the surface. The workpiece includes a region having deep compressive residual stresses imparted by laser shock peening extending into the member from the laser shock peened area. The laser shock peened area of the workpiece comprises rectangular laser shocked spots, the laser beam spots either touching or spaced apart from one another.

An advantage of the present invention is that by not overlapping the laser peened areas on the workpiece, as accomplished in the prior art, a faster coverage of the workpiece surface area is possible during processing. By relying on the newly discovered residual compressive stress bridging between laser peened areas in the workpiece to fill the spaces between the laser spots at acceptable levels of residual compressive stress, dramatic reductions in production time for such workpieces are created.

Another advantage of the present invention is that by using particular non-circular spots such as rectangular, square, hexagonal, and other types of shapes, more uniform processing of the laser shock region is possible, creating a region that is uniformly processed.

A further advantage of the invention is that by the application of rectangular or square spots, produced by a laser beam having a rectangular or square cross sectional area, it is easier to align the laser spot edges to keep the bridging (spacing) distance constant therebetween.

Yet another advantage of the present invention is that it is applicable to areas with parts having changing contours, providing a method to shape the incidence spot of contact, i.e., where the energy from the laser beam in incident upon the workpiece, to make a desired shape for energy concentration, depending upon the need or features of the workpiece to be worked.

Another advantage of the present invention is that of constructing, repairing or modifying a workpiece to have such particularly shaped laser peened spots, i.e., rectangular or square, is now possible. Particular workpieces created may include gas turbine engine components such as turbine blades, engine casings, rotors, integrated blade and disc assemblies, and other metal or alloy parts in need of material improvement.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The improvements in fatigue life produced by laser shock processing are the results of residual compressive stresses developed in the irradiated surface that retard fatigue crack initiation and/or slowing of crack propagation. Changes in the shape of a crack front and slowing of the crack growth rate when the crack front encounters the laser shocked zone have been shown. Laser shock processing is an effective method of increasing fatigue life in metals by treating fatigue critical regions. For a more thorough background and the prior history of laser shock processing and that of high powered processing of engineered materials, reference can be made to U.S. Pat. No. 5,131,957. This patent shows the type of laser and laser circuit adaptable for use with the present invention. Another type of laser adaptable for use with the invention, is that with a Nd-Glass Laser manufactured by LSP Technologies, of Dublin, Ohio.

Use of transparent and opaque overlays is known with the standard laser shock processing or laser peening processing. Such descriptions of transparent and opaque laser peening overlays used with the process are not discussed here.

The present invention includes laser shock processing by utilizing a new phenomenon discovered by the inventors, that of a residual compressive stress bridging effect between laser peened spots on a workpiece.

The known art as shown in U.S. Pat. No. 5,531,570 discloses utilization of particular overlap criteria for the laser peened spots. Such overlapping was done to insure that no gaps of worked areas were provided within the laser shock region along with ensuring that the entire region would have a sufficient residual compressive stress component. With the discovery of the present inventors, the laser peening process may be accelerated and made more efficient by eliminating the overlapping requirement of the prior art of the present invention.

The inventors have developed and found that a particular sized gap may be utilized between laser peened spots on a workpiece, such that residual compressive stress field developed at the surface in the gap between the laser peened spots along with the areas beneath the gap have a sufficient residual compressive stress profile to alter the material properties of the workpiece as desired.

Figure 1:
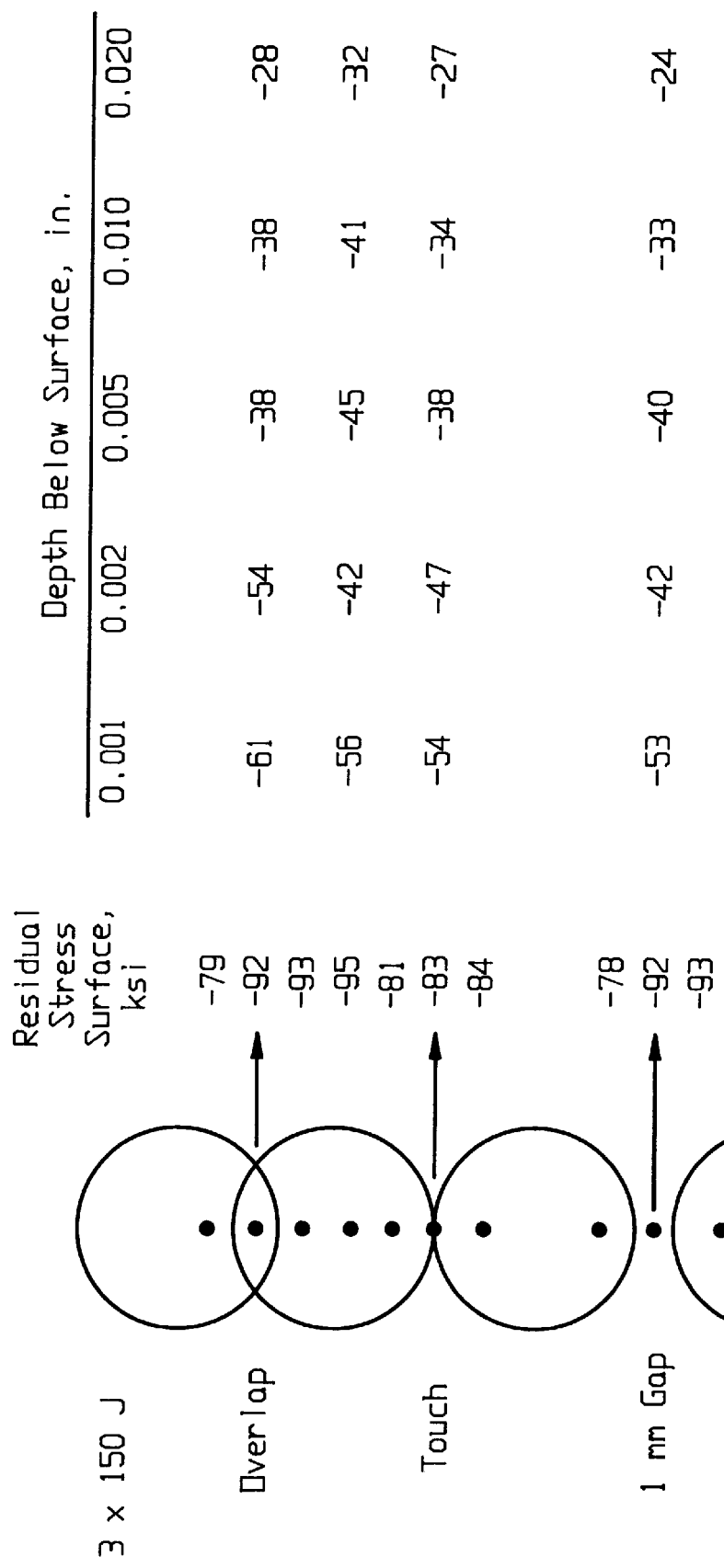
FIG. 1 is a graph of experimental data showing the bridging effect of particular orientations of circular spots showing residual compressive stresses in the overlapped, touching, and gap conditions.

As shown in FIG. 1, test data as applied to a test piece of ductile cast iron is shown. The circles represent the particular laser peened spots on the workpiece having particular overlap, touching, and gap criteria. The small black spots within the circle locate the test spots where residual compressive stress was measured either at the surface, or both at the surface and at particular depths, as indicated. Each of the laser spots were laser peened three times within an effect power of approximately 150 joules per centimeter squared.

Such data indicates that no such overlapping of laser peened spots is necessary to create the required or desired residual compressive stress component profile in such area and with such workpiece. As hypothesized, the bridging distance is a function of the intensity of the laser peening process, along with particular bridging dynamics created for different materials, different shapes of materials, different shapes of laser peened spots, and different strengths of the laser beam. The bridging phenomenon appears to work as a superposition of residual compressive stresses created by the separated laser peened spots. It is possible that there is a joining of the stress contours beneath the surface of the workpiece that maintain the residual compressive stress over the laser shock region desired.

The advantage of utilizing the bridging distance concept, or creating gaps between the laser peened areas, is that for a particular sized laser shock region, in a particular size and shape of laser spot, such process allows faster coverage of the parts surface with possibly fewer laser beam applications. The process relies on bridging to fill the spaces between the laser peened spots to create acceptable levels of the residual compressive stress field.

Figure 2A:
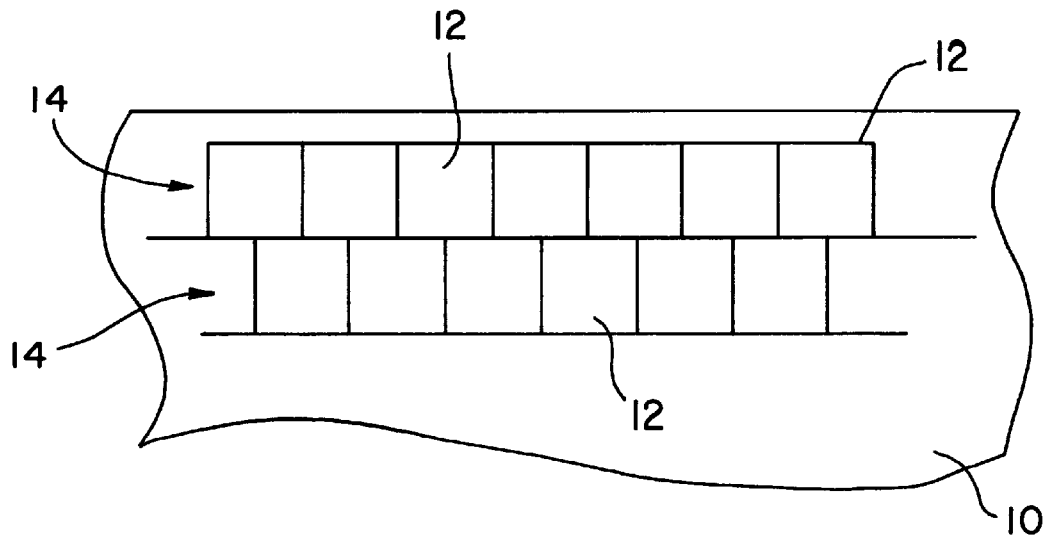
FIG. 2A is a schematic side view of a first laser beam pattern of a laser shock peened area on a workpiece, in which the laser spots are touching.

It has been determined that for an efficient laser peening process, the amount of overlap of the laser peened spots should be kept to a minimum. As shown in FIG. 2A, laser peened spots 12 applied to a workpiece 10 are shown oriented such that adjacent laser peened spots 12 have touching or contacting edges within a row 14. As previously defined, touching of adjacent spots is defined that each spot is in contact with an adjacent spot without significant or substantial overlap. Such overlap should be limited to five percent or less of the spot area. Such reduced overlap increases the efficiency of the peening operation.

Further, it is shown in FIG. 2A, that adjacent rows 14 of the laser spots are also aligned edge to edge such that adjacent spots 12 between rows 14 additionally touch without overlapping.

Figure 2B:
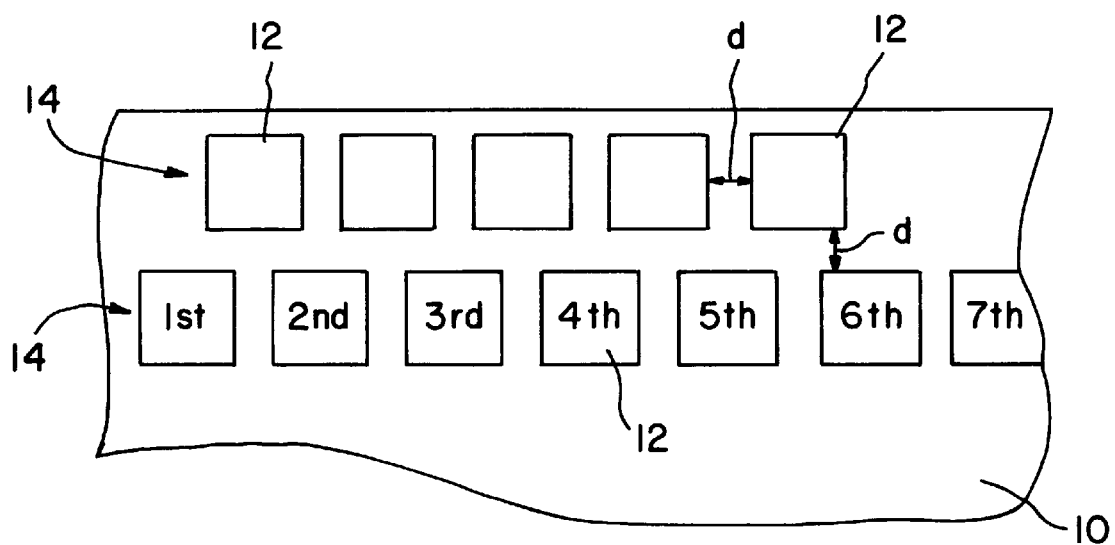
FIG. 2B is a schematic side view of a second laser beam pattern of a laser shock peened area on a workpiece in which the laser spots are separated.

In a more preferred embodiment, FIG. 2B shows the use of laser peened spots 12 separated by distance (d) between spots in a same row 14 while the same distance (d) is used between adjacent rows 14. Such constant distance (d) between laser spots 12, both within a row 14 and between rows 14, maintains a particular minimum residual compressive stress component therebetween.

Distance (d) is maintained for a particular laser peening intensity, material of workpiece 10, geometry of workpiece 10, and geometry of spot 12. In this case a rectangular (i.e., specifically square) spot has been utilized. The distance (d) is determined such that there are no residual tensile stresses created at the surface of workpiece 10. Of course, in the most preferred case, residual compressive stress should be created both at the surface of workpiece 10 and to a depth beneath the surface.

Although taught in this application of a particular inter-spot gap or distance (d) between adjacent laser spots, such adjacent spots need not be peened consecutively. In one form of the invention, actual laser spots may be peened out of order to facilitate other areas of typical laser peening methodology. In such a case, for example, in a linear alignment of laser spots (Row 14 FIG. 2B), every third spot, the first (Spot 1st), fourth (Spot 4th), and seventh (Spot 7th) spots may be peened sequentially (i.e., respectively processed as the first, second and third spots processed in Row 14). After cleaning and repainting of workpiece 10, spots labeled second (Spot 2nd) and fifth (Spot 5th) may be sequentially peened. Again after cleaning and repainting of workpiece 10, spots labeled third (Spot 3rd) and sixth (Spot 6th) may be sequentially peened. Sequentially peening, in this example, the spots in the order of 1, 4, 7, 2, 5, 3, and 6 reduce the need for cleaning and repainting between such spots to three. Of course, selecting a different number of spot positions to skip while processing may vary. By the proper selection of the skipping index (in this example 3) a reduction of cleaning and repainting of the workpiece results. This process of peening selected spots, as by skipping, then going back to repaint and peen other ones, prevents possible peening of adjacent spots that may have paint damage caused by the peening of the adjacent spot.

This skipping process may also be accomplished in more than one dimension. For example, for workpieces having a plurality of Rows 14 to be processed, particular rows may processed out of sequential or adjacent order so that no damage occurs to adjacent spots on adjacent rows. Such skipping of rows and spots may be utilized together so that the entire area to be laser peened on the workpiece may be covered in mosaic of peened spots varying in both row and column, the entire area cleaned and repainted before peening some of the skipped spots and skipped rows. There is no necessity for the skipping number (i.e., every third spot, every third row) to be equivalent, as such may change with workpiece geometry and processing conditions.

Figure 3:
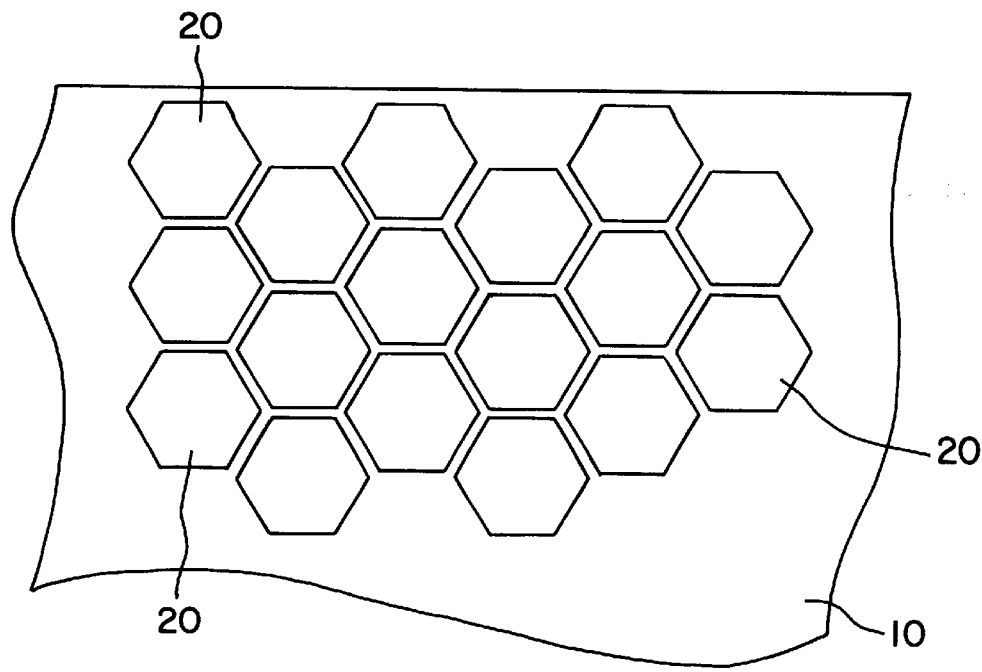
FIG. 3 is a schematic side view of a third laser beam pattern of a laser shock peened area on a workpiece showing hexagonal laser spots.

As previously discussed, alternate shapes of laser spots applied to workpiece 10 may be utilized. The inventors have determined that spots with straight edges are more preferred, since it is possible to maintain and control the inter-spot gap or distance (d). FIG. 3 shows hexagonal spots 20 utilized to cover a region of workpiece 10. Alternatively, other shapes may be used including circular or elliptical, but such coverage may not be totally efficient, in terms of processing time and elimination of overlap.

Figure 4:
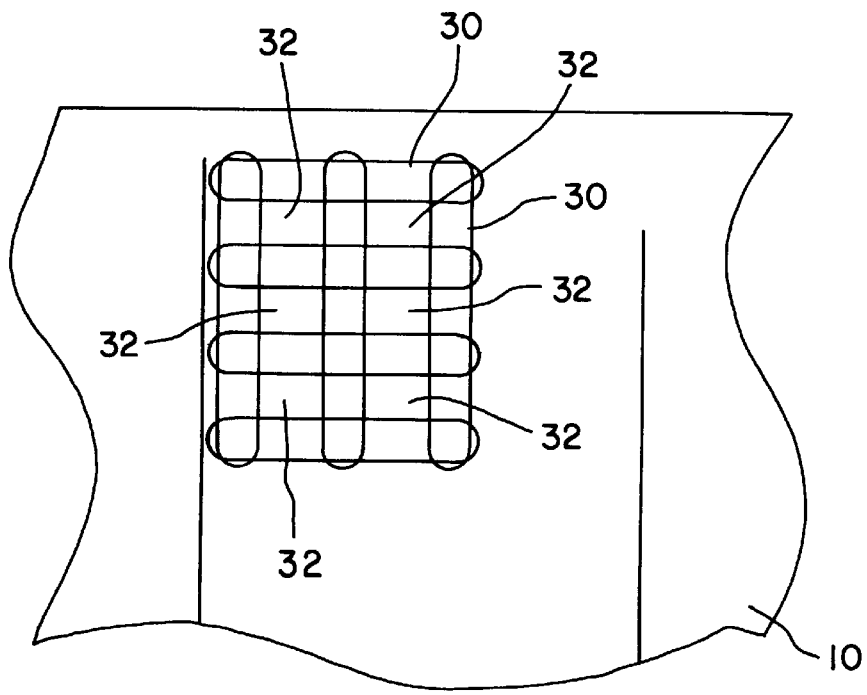
FIG. 4 is a schematic side view of a fourth laser beam pattern of a laser shock peened area on a workpiece utilizing elliptical spots overlaid, which are overlaid to form a mesh with interwoven non-processed areas.

As shown in FIG. 4, elliptical spots may be utilized to create a mesh with interwoven non-processed areas 32. These elliptical spots 30 are overlaid in a fashion such that the non-processed areas 32 utilize the bridging effect found by the inventors such that either at such non-processed areas on workpiece 10 no residual tensile stresses are formed or, more preferably, residual compressive stresses are formed both at the surface and therebeneath.

Figure 5:
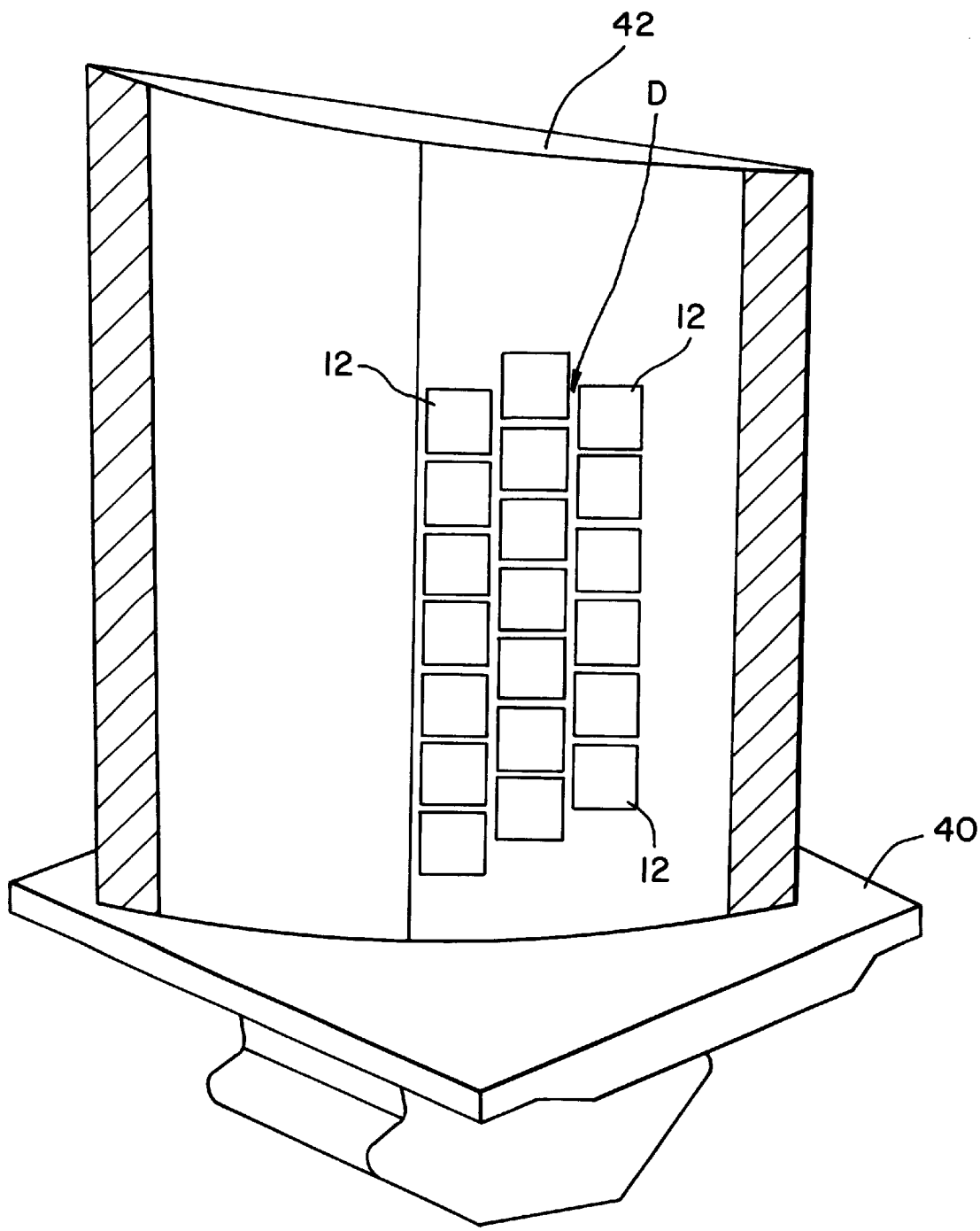
FIG. 5 is a perspective illustrated view of a workpiece, such as an aircraft gas turbine engine compressor blade in accordance with the present invention.

Although the laser peening process of the present invention may be utilized on all different types of workpieces, most preferably it is used on workpieces in which compressive residual stresses are desired. Particular workpieces created with the process include, as shown in FIG. 5, a gas turbine engine blade 40. Similarly, other typical workpieces include gas turbine engine rotors, integrated blade and disc assemblies, turbine casings, and other parts and areas in which fatigue, resistance, and other such laser processing enhanced properties may be desired. FIG. 5 shows the aircraft gas turbine engine blade 40 having a particular laser shocked region with a plurality of laser peened rectangular spots 12 (in this case square spots) aligned with a particular gap distance (D) therebetween. Although shown at the mid-portion of the airfoil 42, such laser processing may be accomplished on the leading edge 43, and/or trailing edge 44 of blade 40.

Figure 6A:
FIG. 6A is a cross sectional view of a kaleidoscopic integrator.
Figure 6B:
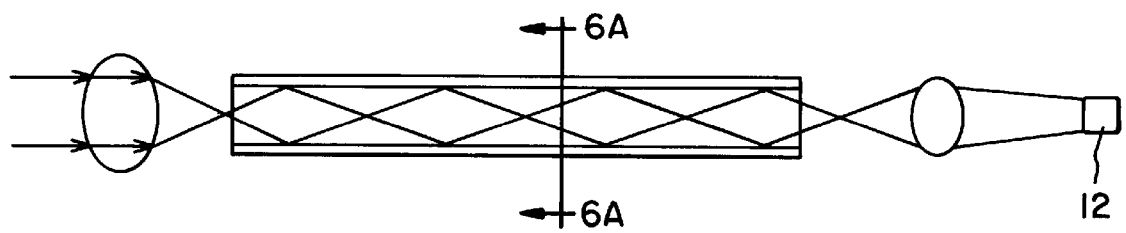
FIG. 6B is a side sectional view of a kaleidoscopic 20 integrator.
Figure 6C:
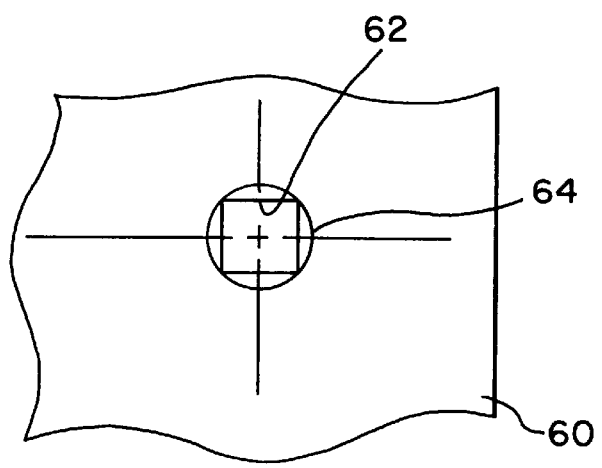
FIG. 6C is a plan view of a laser mask.

The particularly shaped laser spots 12, 20, and 30 may be constructed in a number of different equivalent ways. One way is by utilizing a mask in the laser beam path as shown in FIG. 6C. Mask 60 is made of an opaque material having a cut-out 62 in the desired cross section shape of the laser beam, to create the laser spot shape on the workpiece. FIG. 6C shows a rectangular (i.e., square) cut out 62 with a conventional laser beam having circular cross section 64 impacting mask 60. Such laser beam 64 would be prevented from totally passing through mask 60 while permitting only the shaped portions of the laser beam to exit through the mask opening 62. Alternatively, different other shapes may be utilized for the cut-out 62 within mask 60 such as rectangular, elliptical, hexagonal, etc.

Another way to create a particularly shaped laser beam may be that, such as a kaleidoscopic integrator (FIG. 6A and 6B), constructed of a hollow square tube, into which a laser beam is inserted, internally reflects, and by the shape of such integrator thereby shapes the entering circular-cross-sectional laser beam, to that of a rectangular-cross-sectional laser beam, to create a rectangular laser peened spot 12 on application to a workpiece. Alternatively, other apparatus and lens arrangements may be utilized to change the shape of the generated laser beam to that desired for efficient laser peening.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of laser shock peening a workpiece, said method comprising the steps of:

laser shock peening at least one surface of the workpiece so that said laser peened surface extends over an area of the workpiece and forms a region having compressive residual stresses imparted by the laser shock peening extending into the workpiece from the surface; and firing a laser to produce a completed laser shock peened surface with at least one row of laser beam spots, wherein at least two adjacent laser beam spots are spaced apart from each other.

2. The method of claim 1 having more than one row of laser beam spots in which adjacent rows of laser shock peened spots are spaced apart from each other.

3. The method of claim 1 in which the produced laser beam spots are rectangular.

4. The method of claim 1 in which the produced laser beam spots are square.

5. The method of claim 1 in which the produced laser beam spots are elliptical.

6. The method of claim 1 in which the produced laser beam spots are hexagonal.

7. The method of claim 1 in which the produced laser beam spots are circular.

8. The method of claim 1 in which adjacent laser beam spots are separated by a distance that prevents residual surface tensile stress from forming in the workpiece therebetween.

9. The method of claim 8 in which the distance between adjacent laser beam spots is approximately 1.0 mm.

10. The method of claim 1 in which adjacent laser beam spots are separated by a distance that insures residual compressive stresses are formed in the workpiece therebetween.

11. The method of claim 10 in which the distance between adjacent laser beam spots is less than approximately 1.0 mm.

12. A method of laser shock peening a workpiece, said method comprising the steps of:

laser shock peening at least one surface of the workpiece so that said laser peened surface extends over an area of the workpiece and forms a region having compressive residual stresses imparted by the laser shock peening extending into the workpiece from the laser shock peened surface; and firing a laser to produce the laser shock peened surface with at least one row of laser beam spots, wherein at least one unprocessed area is located between adjacent spots in the finished laser peened surface.

13. The method of claim 12 in which adjacent laser beam spots within a completed row are one of touching or spaced apart from each other.

14. The method of claim 12 in which the produced laser beam spots are rectangular.

15. The method of claim 12 in which the produced laser beam spots are square.

16. The method of claim 12 in which the produced laser beam spots are elliptical.

17. The method of claim 12 in which the produced laser beam spots are hexagonal.

18. The method of claim 12 in which adjacent rows are separated by a distance that prevents residual surface tensile stress from forming in the workpiece therebetween.

19. The method of claim 12 in which the distance between adjacent rows is approximately 1.0 mm.

20. The method of claim 19 in which the produced laser beam spots are square.

21. The method of claim 20 in which the distance between adjacent laser beam spots is approximately 1.0 mm.

22. The method of claim 19 in which adjacent laser beam spots are separated by a distance that prevents residual surface tensile stresses from forming in the workpiece therebetween.

23. A method of laser shock peening a workpiece, said method comprising the steps of:

laser shock peening at least one laser shock peened surface of the workpiece;

laser shock peening the laser shock peened surface so that it extends over an area of the workpiece and forms a region having compressive residual stresses imparted by the laser shock peening extending into the workpiece from the laser shock peened surface; and firing a laser to produce the laser shock peened surface with a plurality of rectangular laser beam spots with the unprocessed areas between the completed said plurality of rectangular laser beam spots exhibiting residual compressive stress bridging.

24. The method of claim 23 in which the rectangular spots are overlaid to form a mesh with interwoven non-processed areas.

25. A method of laser shock peening a workpiece, said method comprising the steps of:

laser shock peening at least one laser shock peened surface of the workpiece;

laser shock peening the laser shock peened surface so that it extends over an area of the workpiece and forms a region having compressive residual stresses imparted by the laser shock peening extending into the workpiece from the laser shock peened surface; and firing a laser beam to produce a completed laser shock peened surface with a plurality of elliptical spots overlaid to form a mesh with interwoven non-processed areas exhibiting residual compressive bridging.

26. A method of laser shock peening a workpiece, said method comprising the steps of:

laser shock peening at least one surface of the workpiece so that said laser peened surface extends over an area of the workpiece and forms a region having compressive residual stresses imparted by the laser shock peening extending into the workpiece from the surface; and firing a laser to produce a finished laser shock peened surface with one or more rows of laser beam spots, wherein adjacent laser beam spots are spaced apart from each other.

27. The method of claim 26 in which the produced laser beam spots are rectangular.

28. The method of claim 26 in which the produced laser beam spots are square.

29. The method of claim 26 in which the produced laser beam spots are elliptical.

30. The method of claim 26 in which the produced laser beam spots are hexagonal.

31. The method of claim 26 in which the produced laser beam spots are circular.

32. The method of claim 26 in which adjacent laser beam spots are separated by a distance that prevents residual surface tensile stress from forming in the workpiece therebetween.

33. The method of claim 26 in which the distance between adjacent laser beam spots is approximately 1.0 mm.

34. The method of claim 26 in which adjacent laser beam spots are separated by a distance that insures residual compressive stresses are formed in the workpiece therebetween.

* * * * *